C. H. Willcox,
Treadle,
No. 99,126. Patented Jan. 25, 1870.
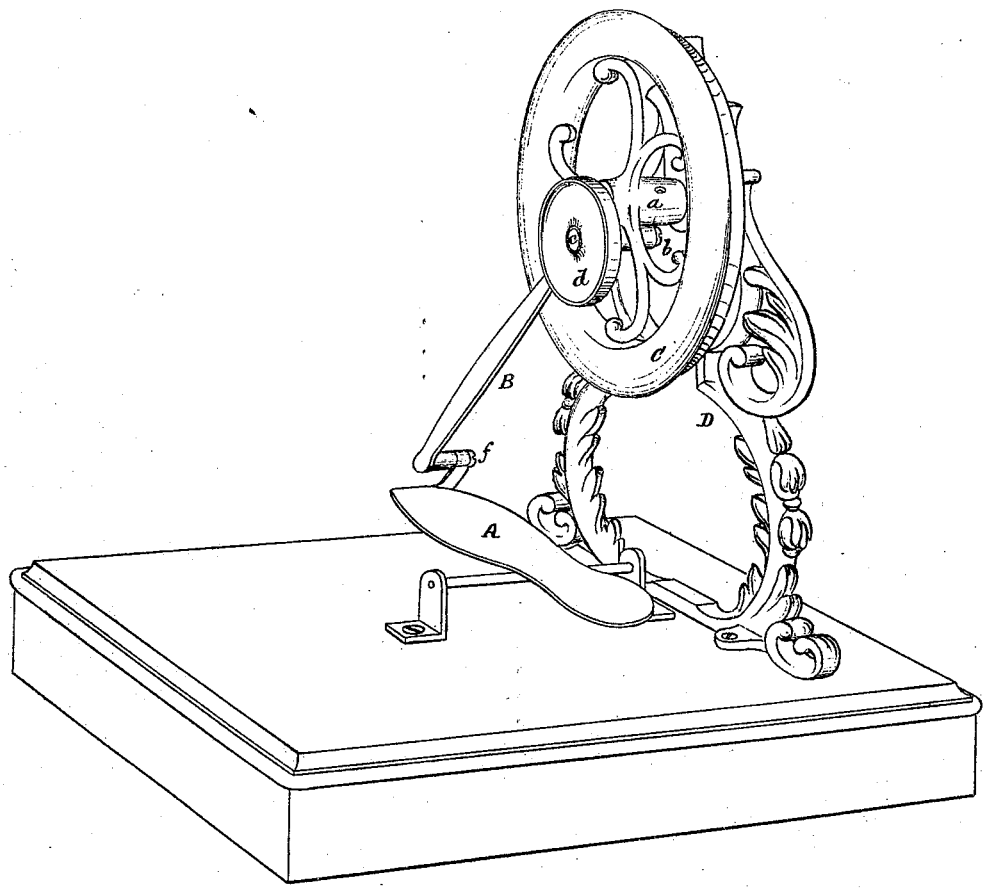
Fig 2
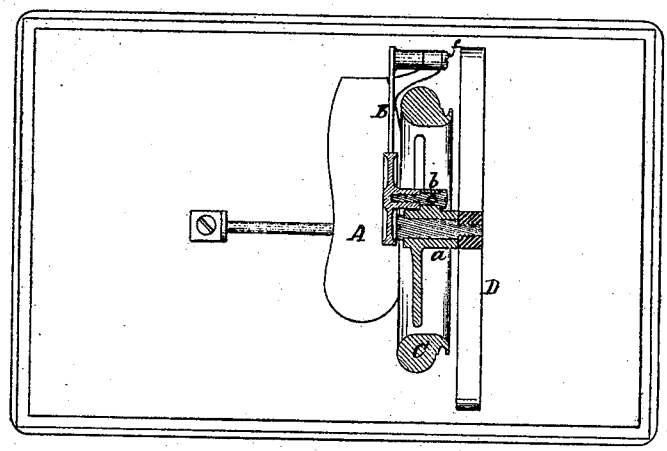
Charles H. Willcox
by his attorney
A. Pollok
Witnesses

United States Patent Office.

CHARLES H. WILLCOX, OF NEW YORK, N. Y., ASSIGNOR TO THE WILLCOX & GIBBS SEWING-MACHINE COMPANY.

*Letters Patent No. 99,126, dated January 25, 1870.*

IMPROVEMENT IN TREADLES FOR SEWING-MACHINES.

The Schedule referred to in these Letters Patent and making part of the same.

*To whom it may concern:*

Be it known that I, CHARLES H. WILLCOX, of the city, county, and State of New York, have invented certain new and useful Improvements in the Construction of Treadle and Crank-Connection in Sewing and other Machinery; and I hereby declare the following to be a full, clear, and exact description of the same, reference being had to the accompanying drawing, in which—

Figure 1 represents a perspective view of a treadle and crank-connection, made in accordance with my invention.

Figure 2 is a horizontal section of the same, through the axis of the wheel.

My invention relates to the mode of connecting the treadle with the driving-wheel for sewing and other like machinery, when the crank-rod or pitman is directly attached to the wheel; and It may be stated to consist—

First, in providing the upper end of the pitman with a disk or guard-plate of sufficient size to cover, during the revolution of the wheel and crank, the hub of the wheel, the pin or stud upon which it turns, and the crank-connection between the pitman and wheel, substantially as and for the purposes hereinafter set forth.

Second, in the combination, with the pitman and crank-pin which it carries, of a hub for receiving said pin, fixed to the driving-wheel, and arranged about centrally between the two ends of the wheel-hub or bearing, as hereinafter described, thereby applying the power necessary to turn the wheel, at about the centre of the wheel-hub or bearing, which is thus caused to wear evenly, instead of at the crank-end, as has ordinarily been the case.

Third, in the arrangement of the joint-pin which connects the treadle and pitman, in relation to the crank-pin connecting the pitman and driving-wheel, so that a plane parallel with the driving-wheel, and passing through the middle of the one, shall pass through the middle, or thereabout, of the other, whereby the power is applied in a direct line with the upper bearin, and so as to prevent uneven wear, and to allow the wheel to be more easily moved.

The nature of my invention will be fully understood by reference to the drawing, in which—

A represents the treadle;

B, the pitman or connecting-rod; and

C, the wheel.

The latter is provided with a hub or bearing, *a*, which turns upon a stud fixed to projection from the side of the frame D.

Parallel with and about midway between the ends of the wheel-hub, is the crank-hub *b*, which is formed in one piece with, or suitably fixed to the wheel. By thus locating the crank-bearing, the power required to turn the wheel is applied centrally between the two ends of the wheel-bearing or hub, which is thus caused to wear evenly, that is to say, it wears evenly at each end, which it would not do were the crank-bearing located at its front end, for instance, for in that case the front end, receiving the direct application of the power, would wear much more rapidly than the other, and the wheel would thus soon have an uneven bearing.

The pitman B is provided with a crank-pin, *c*, which fits in the bearing *b*, and is held there in any ordinary or suitable manner.

Upon the upper end of the pitman, I form a disk or guard-plate, *d*, which is of such size as to amply cover both the crank and the wheel-hubs at any part of the revolution of the wheel. The employment of this disk is advantageous in many respects. It prevents the dress of the operator from ever coming in contact with either of the hubs, both of which require to be oiled, and also renders it impossible for any one to jam or cut his fingers by getting them caught between the pitman and end of the stud upon which the wheel revolves. This often happens to those endeavoring to start ordinary machines, for they usually take hold of the pitman near its upper end, and commence to move it, so as to revolve the wheel; but the pitman is as close to the end of the wheel-stud or journal as possible, so that when it crosses the end of the stud, in making the upper half of its movement, the fingers are caught and crushed or cut by the shearing-action of the pitman across the stud. The disk prevents this danger, by covering completely both hubs at every part of the revolution of the wheel, and, so far as this is concerned, it would accomplish the same result even if the crank-pin were attached to the wheel and worked in a socket formed in the disk or pitman in the usual manner, instead of, as in the present instance, being made fast to the pitman and working in the hub *b*. I prefer, however, the arrangement described and shown, for the reason, that besides admitting of the bearing *b* being located as above described, it prevents any oil getting on the side of the disk next to the operator, which could not be wholly guarded against were the pin to work in a socket through the pitman or disk.

The lower end of the pitman is jointed to the treadle by a pin, *f*, which enters a socket at the toe of the treadle, and is so arranged that a plane parallel with the wheel, and passing through the middle of the crank-pin or hub, will pass through the middle of the pin *f*, or its socket, so that the power is communicated from the treadle to the crank in a direct line, in such manner as to avoid all uneven pressure upon any part of the two bearings, and to allow the power to be applied to the best advantage.

Having now described my invention, and the manner in which the same is or may be carried into effect,

What I claim, and desire to secure by Letters Patent, is—

1. Providing the upper end of the pitman with a disk or guard-plate of sufficient size to cover, during the revolution of the wheel and crank, the hub of the wheel, the pin or stud upon which it turns, and the crank-connection between the pitman and wheel, substantially as and for the purposes set forth.

2. The combination, with the pitman and crank-pin which it carries, of a hub for receiving said pin, fixed to the driving-wheel, and arranged about centrally between the two ends of the wheel-hub or bearing, substantially as and for the purposes set forth.

3. The arrangement of the joint-pin which connects the treadle and pitman, in relation to the crank-pin connecting the pitman and driving-wheel, so that a plane parallel with the driving-wheel, and passing through the middle of the one, shall pass through the middle, or thereabout, of the other, whereby the power is applied in a direct line with the upper bearing, and so as to prevent uneven wear, and to allow the wheel to be more easily moved, as set forth.

In testimony whereof, I have signed my name to this specification, before two subscribing witnesses.

CHAS. H. WILLCOX.

Witnesses:
ED. B. WILLCOX,
P. N. KLINE.